United States Patent [19]
Moran et al.

[11] 3,732,947
[45] May 15, 1973

[54] CEMENT EVALUATION LOGGING

[75] Inventors: James H. Moran, Houston, Tex.; Barkev Y. Bakamjian, Ridgefield; Thomas Muricchio, Brookfield, both of Conn.

[73] Assignee: Schlumberger Technology Corporation, New York, N.Y.

[22] Filed: July 9, 1969

[21] Appl. No.: 840,290

[52] U.S. Cl..................181/.5 AC, 340/15.5 BH, 340/15.5 AG, 340/18 DR
[51] Int. Cl. ................................................G01v 1/22
[58] Field of Search..............340/15.5 CF, 15.5 BH, 340/18 DR; 181/.5 AG, .5 AC, .5 BI

[56] References Cited

UNITED STATES PATENTS

| | | | |
|---|---|---|---|
| 3,401,773 | 9/1968 | Synnott | 181/.5 |
| 3,308,426 | 3/1967 | Wilson | 340/18 |
| 2,956,635 | 10/1960 | Summers | 340/15.5 |
| 3,401,772 | 9/1968 | Kokesh | 181/.5 |

Primary Examiner—Benjamin A. Borchelt
Assistant Examiner—N. Moskowitz
Attorney—Ernest R. Archambeau, Jr., David L. Moseley, Edward M. Roney, William R. Sherman, Jerry M. Presson, Michael J. Berger, Stewart F. Moore & James C. Kesterson

[57] ABSTRACT

An illustrative embodiment of the present invention includes methods and apparatus for acoustically logging a cased well borehole to evaluate the condition of cement disposed in the annulus between the casing and the borehole walls. The attenuation constants associated with the radial modes or resonances of the borehole-casing-annulus formation system are determined by periodically exciting the system with acoustic impulses and measuring in a plurality of relatively narrow frequency bands associated with the resonance frequencies or modes, the amplitudes of the reflected sonic waves at two distinct points in time. The attenuation constants so measured may then be used in apparatus designed to calculate cement effectiveness by determining the cement thickness and width of annulus between the casing and the cement.

28 Claims, 17 Drawing Figures

James H. Moran
Barkev Y. Bakamjian
Thomas Murrichio
INVENTORS

BY William J Beard

ATTORNEY

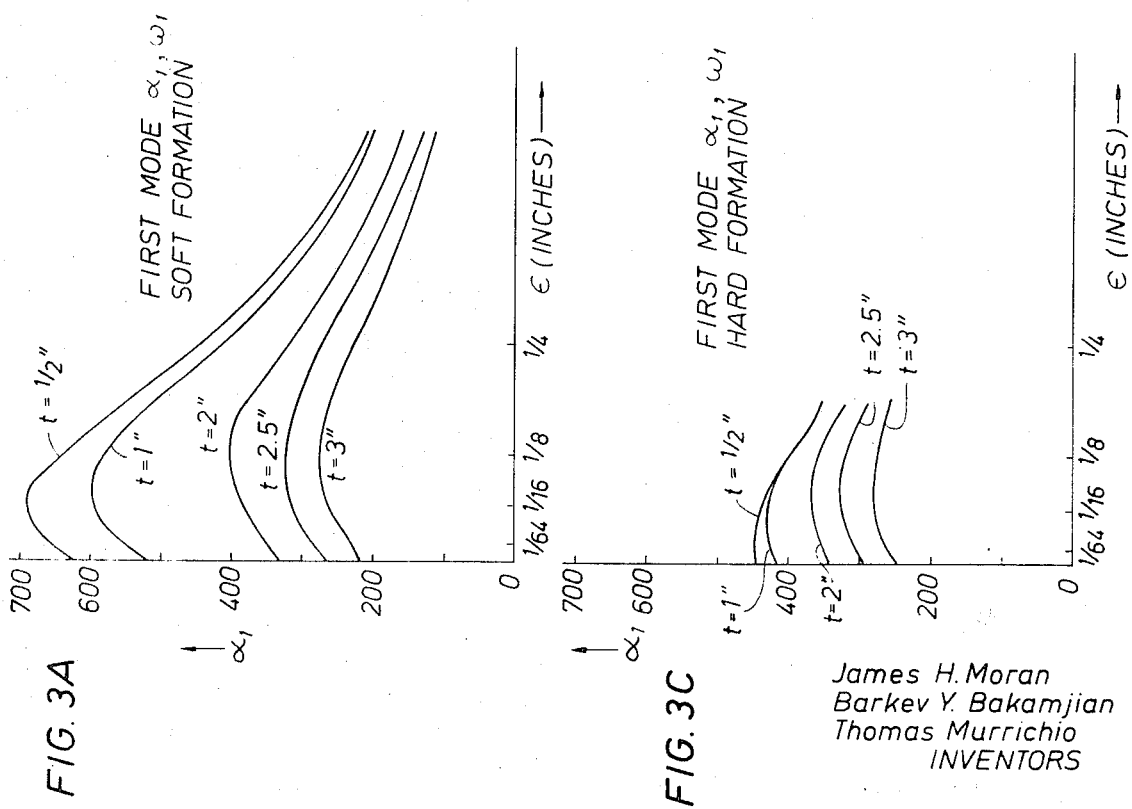
FIG.3A FIRST MODE α₁, ω₁ SOFT FORMATION
FIG.3B SECOND MODE α₂, ω₂ SOFT FORMATION
FIG.3C FIRST MODE α₁, ω₁ HARD FORMATION
FIG.3D SECOND MODE α₂, ω₂ HARD FORMATION
James H. Moran
Barkev Y. Bakamjian
Thomas Murrichio
INVENTORS
BY William J Broad
ATTORNEY

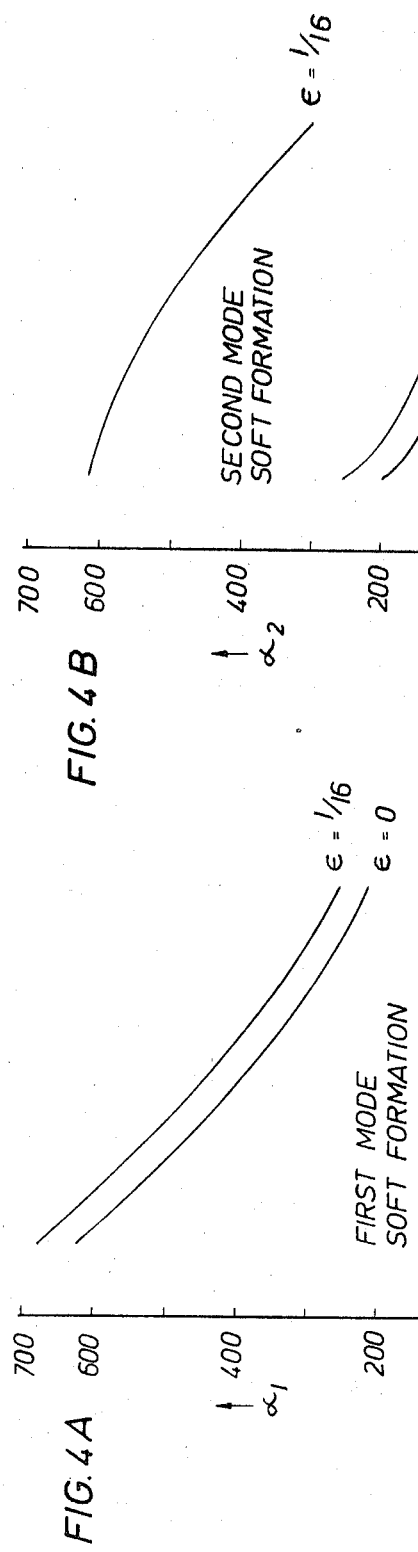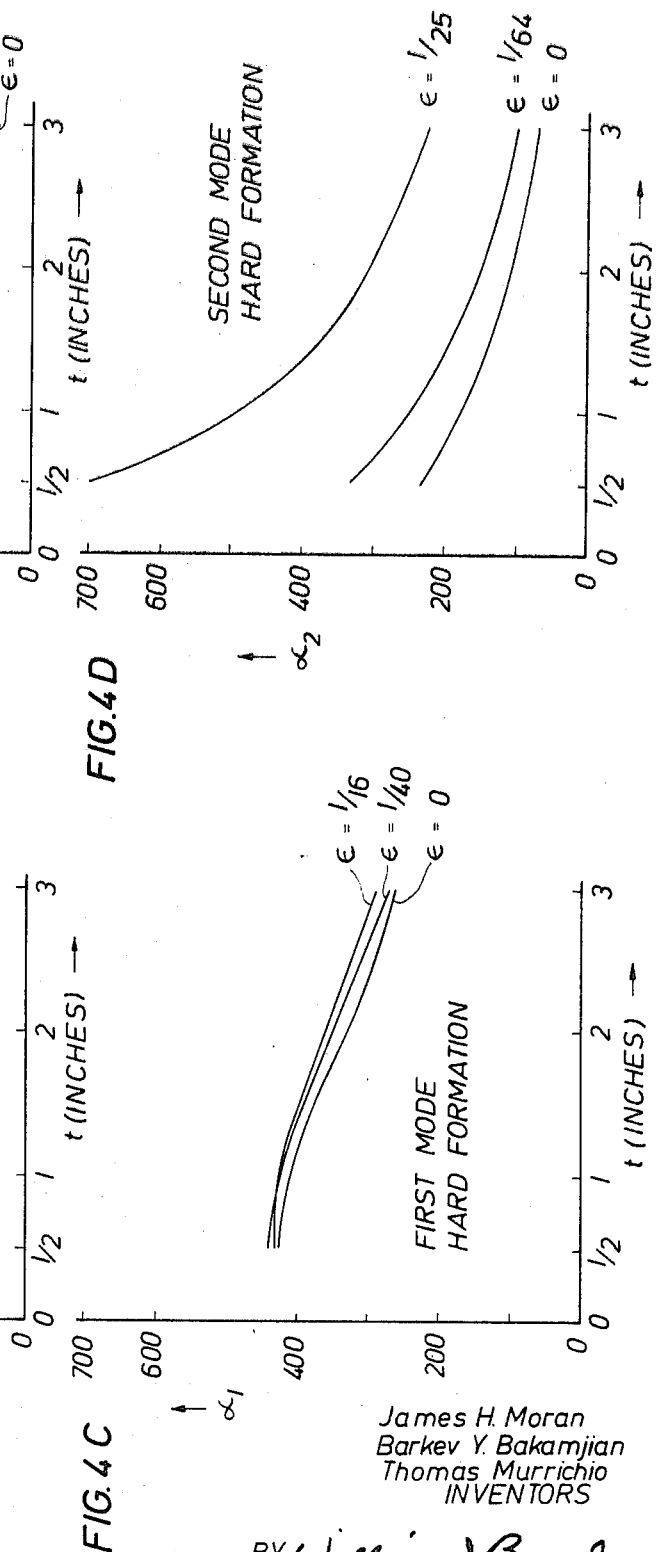

James H. Moran
Barkev Y. Bakamjian
Thomas Murrichio
INVENTORS

BY William J Beard

ATTORNEY

CEMENT EVALUATION LOGGING

BACKGROUND OF THE INVENTION

In a well completion, a string of casing or pipe is set in a well bore and cement is forced into the annulus primarily to separate oil and gas producing horizons from each other and from water bearing strata. Obviously, if the cement fails to provide a separation of one zone from another, then fluids under pressure from one zone may be able to migrate and contaminate an otherwise productive zone. Migration of water, in particular produces undesired watercutting of a producing zone and possibly can make a well non-commercial.

It is difficult to obtain an accurate picture of conditions behind a casing because of the difficulty of propagating signals through the metal casing wall. Various prior proposals to determine the separation effectiveness (the blocking or sealing characteristics) of the cement behind the casing have not been entirely successful in clearly determining the effective presence of cement in the annulus between the casing and the formation as well as the quality of the bond between the casing and the cement and the quality of the bond between the cement and the formations.

The presence or absence of cement in the annulus is valuable, but not complete information. While cement may be present in the annulus, channels or inadequate sealing may still permit fluid communication between adjacent formations.

Use of the term "bond" in connection with the relationship of cement to the casing or the formation is somewhat vague since adherence along the entire boundary between the casing and cement or between the cement and formation is not necessary to prevent fluid communication between adjacent porous zones. All that is necessary for a bond is that the relationship prevents migration of fluids. Hereafter, reference to "bond" will mean that separation of zones by cement is adequate to prevent fluid migration between the zones.

Determining the existence or presence of a bond between the casing and cement is perhaps the most desirable measurement. This measurement is difficult to obtain because the outside surface of the casing is relatively smooth and difficult for the cement to adhere to. Several prior developments for obtaining a measurement of the quality of a cement bond relative to the casing have been disclosed in U.S. Pat. Nos. 3,291,247; 3,291,248 and 3,292,246, all assigned to the assignee of the present invention. These systems have generally utilized acoustic principles where an acoustic signal is transmitted between a transmitter and receiver. The amplitude of the early arrival signal (the early arrival is a casing signal since the acoustic impulse generally travels faster in the casing than in the surrounding cement) at the receiver is measured as a determination of the quality of the bond of cement to the casing. If a good bond existed, the casing signal would be expected to be attenuated because of the energy being dissipated to the cement and surrounding formations, whereas, if no bond or a poor bond existed, the casing signal would be relatively unattenuated. This procedure is sound enough if a good cement-casing contact exists but where a small space or annulus (sometimes called a mirco-annulus) exists between the casing and the cement it can give an indication of poor cement when the cement is actually adequate. By adequate, it is meant that the micro-annulus, even through present, does not permit fluid communication between adjacent porous formations. Moreover, such false indications of poor cement bond can easily be the case because of the manner in which a cement job is performed.

In a primary cementing operation, cement is forced up the annulus about the casing by relatively high pressure applied inside the casing. This pressure tends to expand the casing. The pressure is maintained in the casing while the cement is setting and is then released. Upon the release of pressure the casing can contract, thus forming a micro-annulus between the set cement and casing.

A more refined technique for inspecting cement effectiveness is disclosed in U.S. Pat. No. 3,401,773 entitled, "Method and Apparatus for Cement Logging of Cased Boreholes" by Judson B. Synnott, III and assigned to the assignee of the present invention. In this technique, the amplitude of a reverberated early (casing) signal arrival is recorded and, additionally, the total energy of a selected portion of the sonic signal's later arrival is obtained to provide an indication of the quality of the cement (or integrity of the cement column). Even in the absence of a weak casing arrival, the additional step of observing the total energy by integrating the later arrival signals can confirm presence of cement in the casing formation annulus. Details of a related method may also be had by reference to U.S. Pat. No. 3,401,772 entitled, "Method for logging Cased Boreholes" by Frank P. Kokesh, which is assigned to the assignee of the present invention.

While the foregoing methods and apparatus provide useful information, it is desirable to more precisely determine the quality of the cement bond. For example, the energy contrast between acoustic energy transmitted in the borehole and that arriving at the receiver may depend on other factors than the adherence of cement to the casing or the integrity of the cement column (sometimes called cement quality). Factors which can influence the received acoustic energy are the formation hardness, eccentering of the acoustic logging tool, construction materials of the sonde, type of casing, and diameter of the borehole and casing.

Recognition of these difficulties and some anomalous results in the various prior proposals has led to the development of the methods and apparatus of the present invention which can provide a log with accurate indications of cementing effectiveness under a range of well conditions. This result is accomplished by use of a quantitative theoretical model of the problem, coupled with analysis of the theoretical results and comparison of these results with acoustic logs taken from wells in the field.

Accordingly, it is an object of the present invention to provide a method and apparatus for determining cement effectiveness in a cased borehole.

It is a further object of the present invention to provide a method and apparatus for evaluating cement in a cased borehole which derives cement effectiveness by evaluation of parameters associated with radial modes or resonances of the borehole-casing-annulus-formation system.

A still further object of the present invention is to provide a method and apparatus for evaluating cement effectiveness which yields improved results by determining the attenuation constants associated with the radial energy transfer of acoustic energy from the cased borehole into the formations surrounding the borehole, and by examining this radial energy transfer only in a plurality of relatively narrow and separated frequency bands in a selected portion of the spectrum of the acoustic energy used to excite the system.

Briefly, in accordance with the objects of the present invention, method and apparatus for logging cased boreholes to obtain an evaluation recording of cement are provided. In simplified terms, the present invention departs from the prior art acoustic well logging techniques by considering the radial components of acoustic energy transfer from the borehole-casing-annulus-formation system to examine the cement conditions in the annulus. This is made possible by the use of novel logging apparatus and methods including the use of a plurality of relatively narrow bandpass filters spaced at separated frequency intervals in a selected portion of the acoustic spectrum which pass only that portion of acoustic energy in relatively narrow frequency bands about certain characteristic frequencies, modes, or radially resonant frequencies of the borehole-casing-annulus-formation system.

The invention utilizes the principle that at the characteristic frequencies, or modes, the axial propagation of energy along the borehole is at a minimum and may, for practical purposes, be ignored insofar as it can effect the energy content of received radially reflected acoustic logging signals. The radial modes are reasonably insensitive or predictably sensitive to such factors as the formation hardness, eccentering of casing and borehole, etc. which have detracted from the prior methods and apparatus for cement evaluation. Thus, near the characteristic frequencies or modes of the system, the received acoustic logging signals may be examined by considering only the radial energy transfer of acoustic energy. Certain parameters associated with these modes or resonances may then be examined in detail by the apparatus of the present invention in order to yield accurate and reliable information as to the nature and quality of cement conditions.

More specifically, the present invention provides methods and apparatus for determining the cement effectiveness in a cased borehole by measuring the attenuation constants associated with a plurality of the radial modes of the system. The attenuation constants are measured by periodically exciting the system with acoustic energy and detecting the amplitude of reflected radial acoustic wave energy at two discrete points in time in each of a plurality of relatively narrow frequency bands associated with the radial modes of the system. The attenuation constants determined in this manner may then be used to evaluate the cement effectiveness by means provided to compute the cement thickness and the thickness of the annulus or micro-annulus between the casing and the formation. The attenuation constants, the micro-annulus width and the cement thickness may be logged as a function of borehole depth.

The novel features of the present invention are set forth with particularity in the appended claims.

The operation, together with further objects and advantages of the invention, may be best understood by way of illustration and examples of certain embodiments when taken in conjunction with the accompanying drawings, in which:

BRIEF DESCRIPTION OF THE DRAWINGS

FIGS. 3A, B, C and D are plots of the attenuation function of the characteristic modes of a fluid-filled well bore as functions of micro-annulus thickness and formation type;

FIGS. 4A, B, C and D are plots of the attenuation constant as functions of cement thickness and formation type;

DESCRIPTION OF THE PREFERRED EMBODIMENT

Figure 2A:
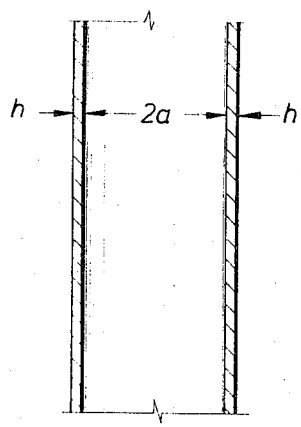
FIG. 2A shows the geometry of the tube for the plot of FIG. 1.

For purposes of background for understanding the present invention, FIG. 2A illustrates an elastic tube which contains a fluid. It is of interest to consider the phase velocity curves for propagation of elastic waves in the axial direction of the tube. We consider only waves which have radial symmetry and purely sinusoidal variation along the axis. By definition, phase velocity is the velocity of a particular characteristic, such as a wave crest, of elastic waves in a transmitting system.

Figure 1:
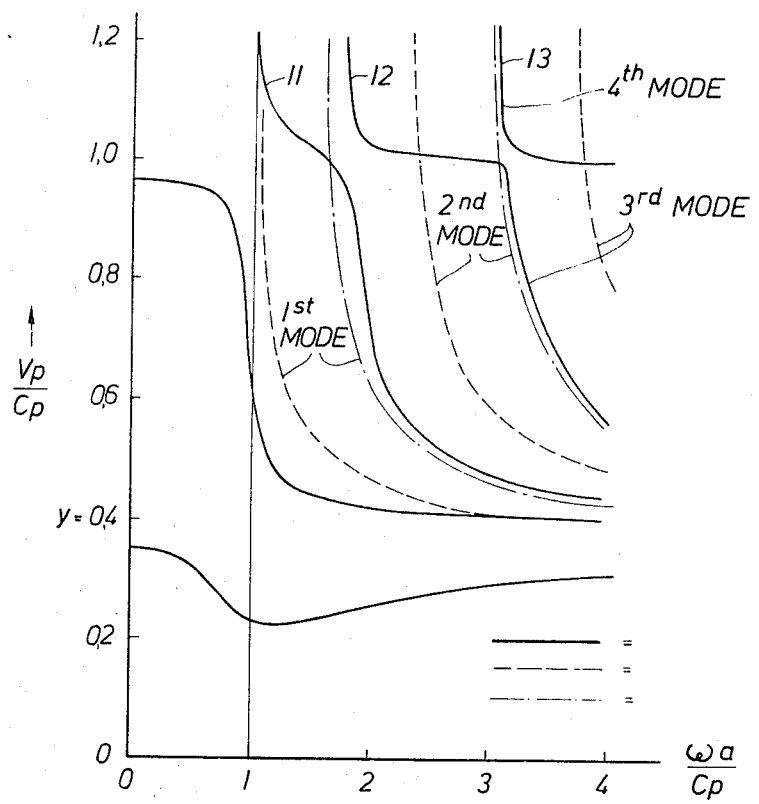
FIG. 1 is a plot showing the phase velocity for an ideal fluid-filled tube for three different tube media.

In FIG. 1, the axial phase velocity is plotted as a function of a dimension-less frequency parameter $\chi_a/C_p$. The ordinate is actually the phase velocity, Vp, divided by the speed of a compressional wave in the elastic tube, Cp. This graph shows that at certain characteristic frequencies the axial phase velocity of the second and higher modes of sonic energy becomes infinite (note curves 11, 12 and 13 of FIG. 1). The frequencies at which this occurs are known as the tube modes, cut-off frequencies or casing resonances of the system. At these frequencies, there is effectively no propagation in the axial direction for that particular mode and all of the energy flow is in the radial direction. This is due to the fact that the group velocity, the velocity at which energy flows in the axial direction, is zero at these frequencies.

The above results indicate that these tube modes might conveniently be measured by a configuration consisting of a finite length acoustic source slightly displaced along the borehole axis from a finite length acoustic receiver.

Figure 2B:
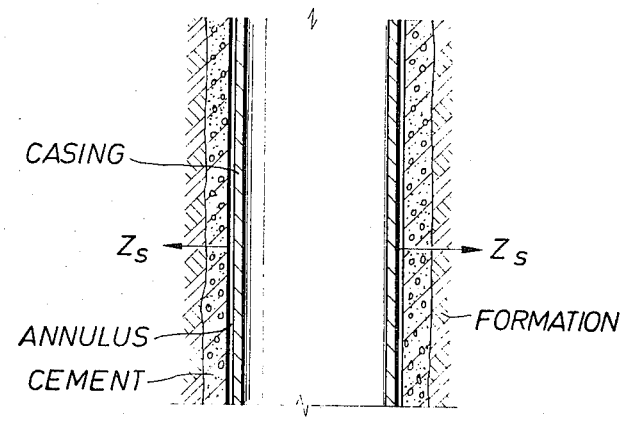
FIG. 2B shows the geometry of a loaded tube.

When an infinite cylinder whose phase velocity is given by the graph of FIG. 1 is surrounded by an infinite medium (as would be the case in a well bore) the cylinder is said to be "loaded". Loading of the casing introduces perturbations into its frequency response due to the materials and the geometry of the system surrounding the casing. A loaded system is shown in FIG. 2B with its cross-section in FIG. 2C. The system comprises a plurality of concentric cylinders having different physical properties. The mathematical formulation describing the system is much more complicated than that of the unloaded cylinder but bears many similarities. The problem of interest with regard to the present invention is that of the propagation of elastic waves in the cylindrically layered system shown. The problem is solved only for elastic waves propagating in the radial direction. Waves moving in the axial direction are not considered. This simplification is suggested by the proceeding phase velocity study which showed the importance of radial waves for the present invention.

The basic ideas of wave propagation in layered media are discussed in many texts. In general, the mathematical approach to these problems is to describe the motion of particles of the various media in terms of a scalar displacement potential function $\phi$ defined by:

$$S = \delta\phi/\delta r \tag{1}$$

where $S$ is the radial particle displacement and $r$ the radial coordinate of the cylindrical coordinate system having a 3 axis along the borehole axis and a $\theta$ coordinate measured from sone reference line (say north) about the Z axis. The wave equation for the particle motion may then be written as:

$$(1/C^2)(\delta^2\phi/\delta t^2) = (\delta^2\phi/\delta r^2) + (1/r)(\delta\phi/\delta r) \tag{2}$$

where $C$ is the speed of compressional sound waves in the media comprising the system. This equation is derived from well-known physical principles and may, for example, be found by reference to *Elastic Waves in Layered Media*, by Ewing, Jardetsky and Press, published by the McGraw Hill Company of New York, 1957 Edition.

The scalar potential function $\phi$ is, of course, time dependent as well as dependent on displacement [i.e., $\phi = \phi(r,t)$]. The time dependence may be taken as that of a travelling wave in order to separate the variables [i.e., $\phi(r,t)=\phi(r)e^{i\omega t}$], where $\omega = 2\pi f$ is the angular frequency of the wave motion of frequency $f$. Using this relation, Equation (2) can be brought into the form $$(\delta^2\phi/\delta r^2) + 1/r\,(\delta\phi/\delta r) + (\chi^2/C^2)\,\phi = 0 \tag{3}$$

It will be useful in the analysis of the system to further define the concepts of the sonic pressure P, as $$p = \rho\chi^2\phi \tag{4}$$

where $\rho$ is the density of the medium, and the radial particle velocity, $U$, as $$U = -i\chi S$$

$$U = -(i/\chi\rho)(dP/dr) \tag{5}$$

where again $S$ is the radial particle displacement and $\chi$ is again the angular frequency. The concept of the impedance Z of a material to the motion of its particles is then defined as the ratio of the sonic pressure at a point in the material to the radial particle velocity at the point or $$Z = P/U \tag{6}$$

Equation (3) may be recognized as a form of Bessel's equation which has a general solution which may be written as $$\phi = A\,H_o^{(1)}(kr) + B\,H_o^{(2)}(kr) \tag{7}$$

where $H_0^1(kr)$ and $H_0^2(kr)$ are complex functions known as the Hankel functions of the first and second kind, zero order. The variable $k = \chi/c$ is the wave number of the waves. $A$ and $B$ are complex coefficients which may be thought of as the respective amplitudes of outgoing and incoming (reflected) waves traveling in the position and negative $r$ directions. The $A$'s represent the amplitude of incoming waves and the $B$'s the amplitude of outgoing waves. The ratio $A/B$ is of particular interest in some applications. This quantity may be thought of as an acoustic reflection coefficient as it represents the ratio of the amplitudes of incoming to outgoing waves in a particular layer of the system.

The general solution given by Equation (7) is valid in each of the several layers of the system, however the coefficients $A$ and $B$ will be different in each layer. By applying the boundary conditions of a particular problem, such as the cement evaluation problem, the coefficients $A$ and $B$ for each layer may be determined for a particular set of initial conditions. Boundary conditions which may be applied to effect a particular solution are:

1. The sonic pressure function P is continuous at the boundary of each of the layers.
2. The radial particle velocity function U is continuous at the boundary of each of the layers.

Recalling Equation (6) these boundary conditions may be related to the acoustic impedance Z. Thus, if the system impedance $Z$ is broken up into its components ($Z = Zc + Za + Zce + Zs + Zf$) in each layer, the functions Zc (casing impedance), and Zf (borehole impedance) may be found by equating $U$ and $P$ for the various media comprising the layers at the layer boundaries. Using these relations the frequency response or modes of the system can be determined.

In general the functions Zc, Za, Zce, Zs and Zf will be complex functions of frequency as will be appreciated from Equation (7), and the relations of the potential function $\phi$ to $P$ and $U$ given in Equations (4) and (5). It would be reasonable to expect the frequency response of the system to be similar to that of the unloaded casing system previously given as in FIG. 1 with perturbations on this frequency response introduced by the loading effects of the surrounding media. Thus, if the complex impedance functions Zc, Za, Zce, Zs and Zf were known, the zeroes or roots of the total impedance function Z would locate the resonant frequencies or modes of the system. A measurement of a parameter associated with the radial modes or resonances of the system could be related to the cement effectiveness or cement conditions in the annulus because of the relationship of the impedance functions to each other through the boundary conditions described above.

The problem is then reduced to that of solving the equation for the total impedance function $$Z = Z_c + Z_a + Z_{ce} + Z_s + Z_f = 0 \tag{8}$$

as a function of frequency and relating these solutions to the cement conditions. It can be shown that the components of the function Z may be given as follows. The casing impedance $Z_c$ as a function of frequency $\chi$ is to a good approximation given by $$Z_c = i\rho_s C_p \ (h/a) \ (C_p/\chi a - \chi a/C_p)$$

Figure 2C:
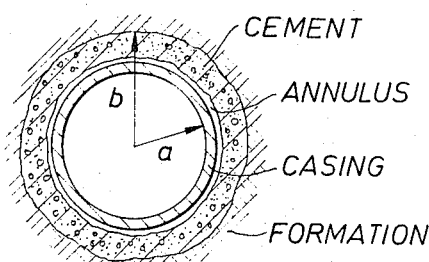
FIG. 2C is a cross sectional view of FIG. 2B.

(9)

where $\rho_s$ is the casing density, $h$ is the casing thickness, $C_p$ is the compressional velocity of casing for acoustic waves and $a$ is the radius of the casing as shown in FIG. 2c.

Similarly, the annulus impedance $Z_a$ may be given approximately as a function of frequency $\chi$ by $$Z_a = \rho C^2/\chi \epsilon$$

(10)

where $C$ is the speed of sound (compressional) in the annulus fluid, $\epsilon$ is the annulus thickness, and $\rho$ is the fluid density in the annulus.

Also, the cement impedance $Z_{ce}$ may be given approximately as a function of the frequency $\chi$ by $$Z_{ce} = i\rho_c C_c \ (t/d) \ (C_c/\chi d - \chi d/C_c)$$

(11)

where $\rho_c$ is the cement density, $C_c$ is the speed of compressional waves in the cement, $t$ is the cement thickness and $d$ is the inner radius of the cement layer.

The formation impedance as a function of frequency $\chi$ may be given as $$Z_s = i\rho_t Vc \ \frac{H_0^{(1)} \left(\frac{\omega}{Vs} b\right)}{H_1^{(1)} \left(\frac{\omega}{Vd} b\right)} + i \ \frac{2\rho_t Vc^2}{\omega b}$$

(12)

where $\rho_t$ is the formation density, $Vc$ is the formation compressional wave velocity, $Vs$ is the formation shear wave velocity and $b$ is the borehole radius as shown in FIG. 2c. Here, $H_0^1$ ($\chi/Vc\ b$) is the Hankel function of the first kind, zero order and $H_1^1$ ($\chi/Vc\ b$) is the Hankel function of the first kind, first order.

Finally, the impedance of the borehole fluid as a function of frequency may be given by $$Z_f = i\rho_t C_f \ \frac{AJ_0\left(\frac{\omega}{C_f} a\right) + BY_0\left(\frac{\omega}{C_f} a\right)}{AJ_1\left(\frac{\omega}{C_f} a\right) + BY_1\left(\frac{\omega}{C_f} a\right)}$$

(13)

where $\rho_t$ is the borehole fluid density, $C_f$ is the compressional wave speed of the borehole fluid and $a$ is the casing radius. Here, $J_0$ is the Bessel's function of the first kind, zero order, $J_1$ is the Bessel's function of the first kind, first order, $Y_1$ is the Bessel's function of the second kind, zero order and $Y_0$ is the Bessel's function of the second kind, first order. The complex coefficients $A$ and $B$ are the same as previously referred to and are determined by applying the boundary conditions for continuity at the inside of the casing.

By combining Equations (9), (10), (11), (12) and (13) as indicated in Equation (8), the characteristic frequencies or modes may be determined. In general, there will be a plurality of modes of the system corresponding to the multiple solutions of the Equation $Z = 0$ as previously discussed. The sonic pressure function as previously defined could be interpreted, for a pulse source of acoustic excitation, to be a superposition of the modes given by $$P = A_1 e^{-\alpha_1 t} e^{i\omega_1 t} + A_2 e^{-\alpha_2 t} e^{i\omega_2 t} + \cdots + A_j e^{-\alpha_j t} e^{i\omega_j t}$$

$$= \sum_j A_j e^{-\alpha_j t} e^{i\omega_j t}$$

(14)

where the coefficients $A_j$ are dependent on the amplitude of the source of excitation, the $\chi_j$'s are the mode frequencies and the $\alpha_j$'s are attenuation constants associated with the mode frequencies $\chi_j$.

The mode frequencies $\chi_j$ have been found not to be strongly dependent on the cement conditions (i.e., on $\epsilon$ the annulus width, or $t$ the cement thickness) but mainly vary with the casing size. Since it is desired to determine the cement conditions, the variations of the attenuation constants, $\alpha_j$, as a function of these parameters is of interest. The attenuation constants, $\alpha_j$, may be thought of as a measure of the time rate of decay of a particular mode when the system is excited by a pulse source of acoustic energy. Each mode, which of course represents a different natural resonance frequency of the system, has its associated attenuation constant. If a particular mode is observed at one instant in time, (the mode being isolated from the remainder of the acoustic frequency spectrum by a suitable bandpass filter which allows only frequencies near its frequency to pass) and its amplitude measured and then the same mode is observed at a somewhat later instant in time, its amplitude will have diminished. By measuring the amount of diminution per unit of time which has occurred, the attenuation constant of that particular mode may be obtained. Then if a relationship is known between the attenuation constants of the various modes and say, $\epsilon$ the annulus thickness, and $t$ the cement thickness, then these parameters could be evaluated and the cement evaluation thus performed.

As previously discussed the resonant frequencies or modes $\chi_i$ are relatively insensitive to micro-annulus thickness $\epsilon$, cement $t$, or rock hardness. They depend primarily on the diameter of the cased hole. The first three $\chi_i$'s can be shown to be, for example, for a 5½inch diameter casing:

$\chi_1 = 13$ KHz.
$\chi_2 = 24.5$ KHz.
$\chi_3 = 35.7$ KHz.

The graphs of FIGS. 3A, B, C and D, and FIGS. 4A, B, C and D illustrate just such a variation of $\alpha$, the attenuation constant, with $\epsilon$ and $t$ as would be necessary to perform cement evaluation by the method described above. The values of the system parameters used to derive the graphs of FIGS. 3 and 4 are given in Table I.

TABLE I

| | |
|---|---|
| Casing diameter and thickness | 5 1/2''; 3/8'' |
| Casing $\Delta T$ and density | 57 ft/sec; 520 lb.ft$^3$ |
| Fluid velocity and density | 5000 ft/sec; 65 lb/ft$^3$ |
| Cement velocity and density | 10,000 ft/sec; 130 lb/ft$^3$ |
| Formation density | 162.5 lb/ft$^3$ |
| Formation velocities | 12,000 ft/sec (soft) |
| | 15,000 ft/sec (medium soft) |
| | 20,000 ft/sec (hard) |
| Annulus Thickness | 0''; 1/256''; 1/128''; 1/64''; ¼''; ½'' |
| Cement Thickness | 0''; ½''; 1''; 2''; 2½''; 3'' |

FIG. 3 shows the variation of $\alpha_1$ and $\alpha_2$ with respect to the annulus width $\epsilon$ for several values of cement thickness $t$. Both hard and soft formations are taken into account in the graphs of FIG. 3. It will be noted that $\alpha$ varies substantially with the change in . Similarly, FIG. 4 shows the variation of $\alpha_1$ and $\alpha_2$ with cement thickness $t$ for several values of annulus width $\epsilon$. Again both hard and soft formations are taken into account in the graphs of FIG. 4. Similarly, it will be noted from FIG. 4 that $\alpha$ varies substantially with changes in $t$. Accordingly, if the formation hardness could be determined independently, say from acoustic travel time (or $\Delta t$) logs taken prior to the casing of the borehole, then measurements of the attenuation constants $\alpha_1$ could be used to evaluate cement conditions behind the casing such as $\epsilon$ and $t$.

To this end, a linearized approximate dependence of the $\alpha_1$ on $\epsilon$ and $t$ in the ranges $0 < \epsilon < 1/16$ inch and ½ inch $< t < 3$ inch for three formation hardness may be derived from graphs such as those of FIGS. 3 and 4. These relationships may be given, for example, by the following type equations (for the parameters of Table I):

Soft Formations
$$\alpha_1 = 960 \epsilon - 191 t + 725$$
$$\alpha_2 = 3328 \epsilon - 92 t + 275 \quad (15)$$
Medium Soft Formations
$$\alpha_1 = 736 \epsilon - 125 t + 600$$
$$\alpha_2 = 3904 \epsilon - 97 t + 275 \quad (16)$$
Hard Formations
$$\alpha_1 = 1520 \epsilon - 141 t + 500$$
$$\alpha_2 = 4672 \epsilon - 138 t + 275 \quad (17)$$

It will be appreciated that similar graphs and relations could be derived for other casing sizes. Such equations may be utilized in acoustic logging apparatus such as that shown in FIGS. 5 and 6 to provide a cement evaluation log (CEL) which is determinative of $\epsilon$ and $t$ behind the casing.

Figures 5A, 5B:
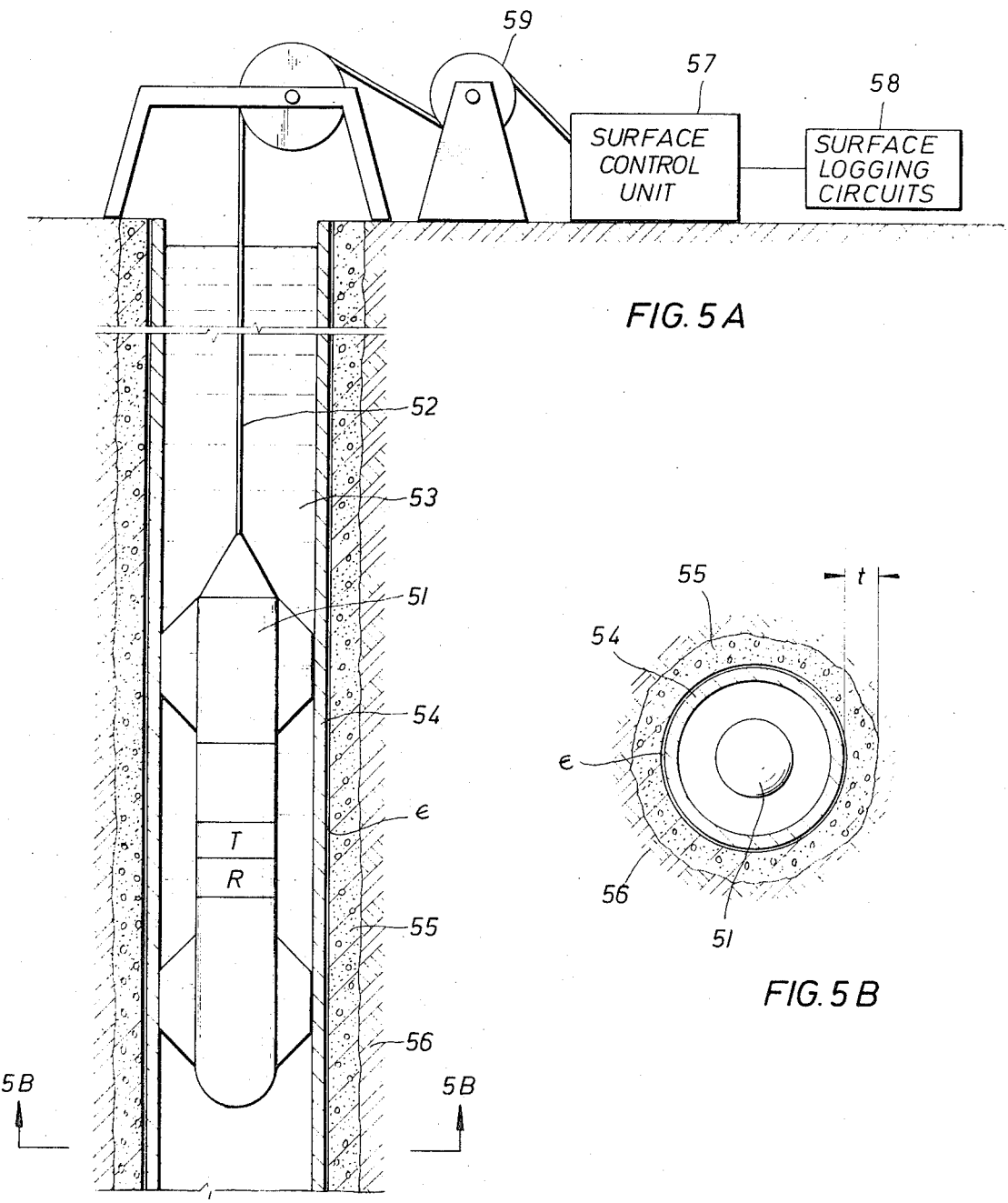
FIGS. 5A and B are schematic figures showing a logging tool for cement evaluation logging in a well bore together with a sectional view of the well bore.

Referring now to FIG. 5A, a logging sonde is shown suspended by an armored electrical cable 52 in a fluid-filled well bore 53 which has casing 54 cemented in place by cement layer 55. Well bore 53 penetrates earth formations 56 which surround the entire system. It will be appreciated that cable 52 while supporting logging sonde 51, also has a sufficient number of conductors to supply electrical power and control signals from surface control unit 57 to the sonde 51 and further to communicate electrical logging signals from the sonde 51 to the surface logging circuits 58. A conventional winch arrangement 59 (shown schematically) is used to lower and raise the sonde 51 in order to perform the cement evaluation logging of the present invention.

FIG. 5B schematically shows a sectional view of the well bore 53 of FIG. 5A near the level of the sonde 51 and illustrates the cement thickness $t$ and a microannulus of width $\epsilon$ which may be measured using the methods and apparatus of the present invention. It will be noted that sonde 51 is provided with an acoustic transmitter T which may be of conventional piezoelectric or magnetostrictive type and an acoustic receiver R which may also be of conventional piezoelectric type and which is placed immediately adjacent transmitter T, in what may be referred to as a zero spacing arrangement.

The configuration shown corresponds most nearly to the geometry of the mathematical models used to study the system and is a preferred arrangement. It has been found however, that it is not absolutely necessary to have the zero spacing arrangement shown in FIG. 5A for the present invention to function properly. The natural lack of symmetries present in actual well bores make such systems perform only approximately as would be indicated by theoretical models. That is, even near the characteristic frequencies, or modes of the system, there will be some propagation of energy axially along the well bore when the system is excited by the acoustic transmitter T. Although in the present invention the radial energy propagation is used to evaluate the cement conditions, this axial propagation of energy near the mode of the system is sufficient to propagate enough energy axially to permit the use of spaced transmitter-receiver pairs as used in conventional acoustic well logging tools if desired.

Figure 6:
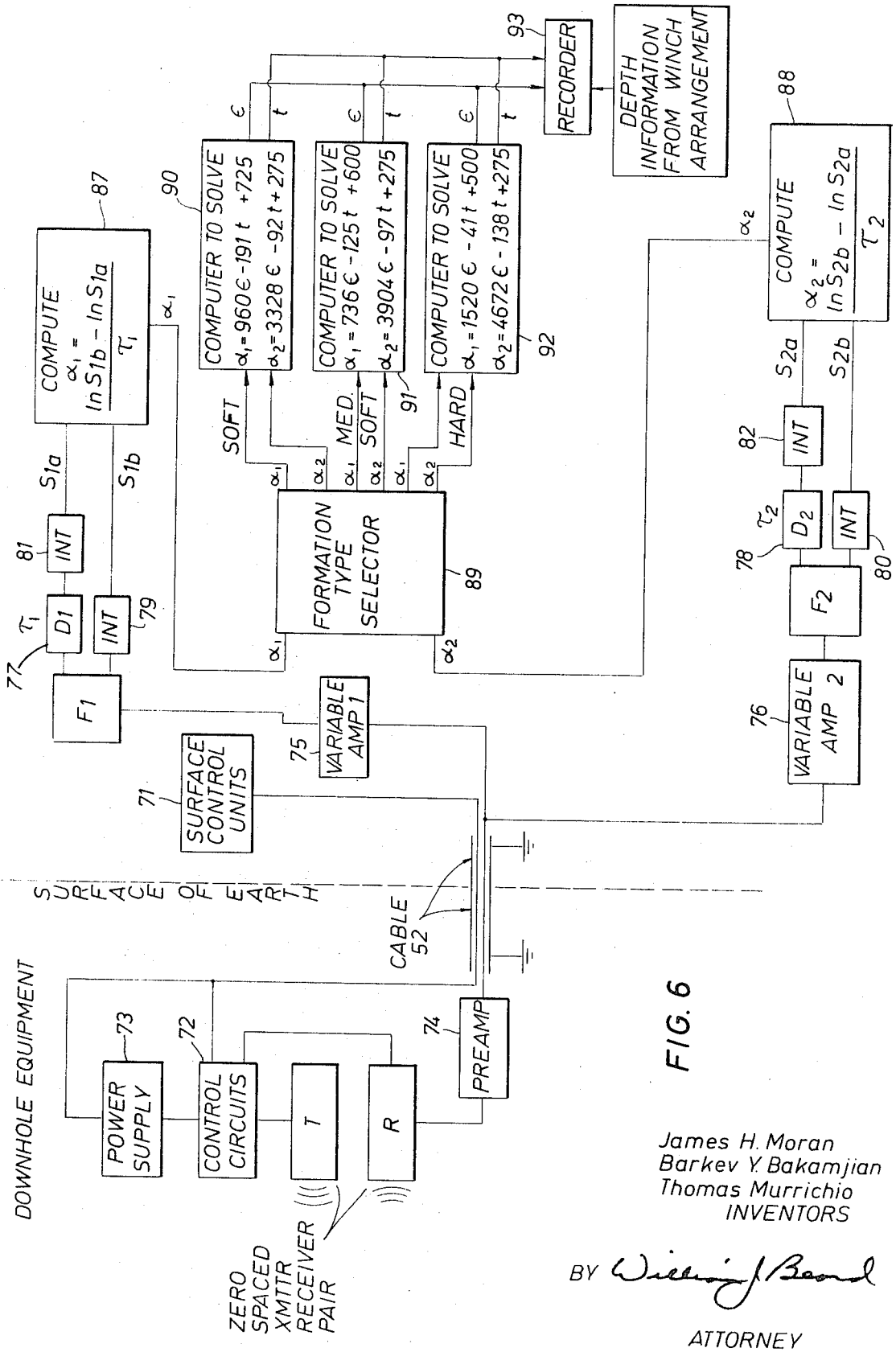
FIG. 6 is a schematic diagram showing circuitry which may be used in the cement evaluation log of the present invention.

Referring now to FIG. 6, the operation of the system shown may be described as follows. Surface control unit 71 provides electrical power on cable 52 to operate the downhole power supply 73 of the downhole logging equipment shown separated from the uphole circuitry by a dashed line representing the earth's surface. Additionally, control unit 71 provides control signals on cable 52 to prescribe and control the measuring sequence in the downhole tool. For example, although one zero spaced transmitter-receiver pair is shown in the downhole tool, it will be appreciated by those skilled in the art that it may be desirable to utilize a plurality of acoustic transmitters and/or receivers in order that the same downhole tool be useable for other purposes, such as for acoustic travel time (or $\Delta t$) logging. The control signals may, for example, comprise coded sequences of binary numbers which are decoded and acted upon in a prescribed manner by downhole control circuits 72. The signals may be used to prescribe a sequence of transmitter firings and the activation of a particular acoustic receiver or receivers in a manner desired to accomplish a particular type of measurement. Examples of control circuits of the type which could be used for this purpose both for surface control unit 71 and downhole control circuits 72 may be found by reference to U.S. Pat. Nos. 3,304,536 and 3,304,537 which are assigned to the assignee of the present invention.

Assuming that control circuits 72 have activated transmitter T to produce an acoustic impulse to excite the system and have enabled acoustic receiver R to receive the resulting reflected acoustic energy coming back from the impedance discontinuites of the system, the electrical signal output of receiver R which is representative of the received acoustic energy is amplified by preamp 74 and is transmitted up cable 52 to the surface for further processing. A portion of the signal is coupled to a first variable amplifier 75 and another portion to a second variable amplifier 76. Amplifiers 75 and 76 amplify their respective inputs to different amounts to compensate for the frequency response characteristics of the receiving transducers.

Figure 7:
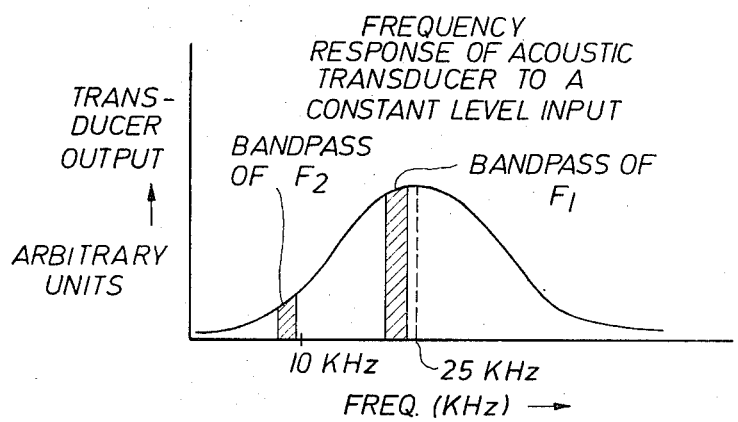
FIG. 7 is a plot showing the frequency response of a typical acoustic logging transducer.

This concept may be more easily understood by reference to FIG. 7 which shows the frequency response of a typical acoustical receiving transducer with the passbands of filters $F_1$ and $F_2$ superimposed on it. Since the energy content of the received acoustic signal is to be examined in a plurality of relatively narrow frequency bands near the characteristic frequencies or modes of the system, it is necessary to remove any distortion in the energy content of the received signal which is introduced by the characteristics of the transducer. If the transducer is more sensitive to energy in the frequency region of filter $F_1$, for example, than in the frequency region of filter $F_2$ as shown in the case of FIG. 7, then variable amplifier 75 will be adjusted to amplify its input signal by a lesser amount than the input signal to amplifier 76. This will correct for the bias introduced into the received signal by the characteristics of the transducer. This process may be referred to as normalizing the input signals.

The outputs of variable amplifiers 75 and 76 are then passed through two relatively narrow bandpass filters $F_1$ and $F_2$ whose center frequncies are chosen to coincide or nearly coincide with the predicted characteristic frequencies or modes of the casing-micro-annulus-cement-formation systems. It will be recalled that these frequencies or modes are relatively insensitive to formation hardness or cement conditions and primarily dependent on the size of the cased hole. The frequencies of the first two modes may be, for example, for 5 ½ inch casing, $F_1 = 13$KHz and $F_2 = 24.5$ KHz. The passband width of bandpass filters $F_1$ and $F_2$ at their half power response points may be chosen to be about 5 KHz, in order to examine the energy content only in the immediate region of the characteristic frequencies or modes. This, it will be recalled, allows the signals to be examined in detail with regard to the radial energy transfer. The output of bandpass filters $F_1$ and $F_2$ are then split again and a portion of the output of $F_1$, for example, is passed through an electrical delay line 77 having a time delay of $\tau_1$ seconds. A portion of the output of filter $F_2$ is similarly passed through a separate delay line 78 having a delay time of $\tau_2$ seconds. The remaining portions of the output signals from $F_1$ and $F_2$ are coupled to integrators 79 and 80, respectively, which may be conventional RC integrator networks or the like having a response time much less than the delay times $\tau_1$ and $\tau_2$. Thus, at any instant in time, say $T_0$, the output signals from integrators 79 and 80 are indicative of the energy content of the acoustic logging signal in the frequency regions of filters $F_1$ and $F_2$ at that instant and may be denoted $S_{1b}$ and $S_{2b}$ respectively.

Similarly, the output signals from delay lines 77 and 78 are input to integrators 81 and 82 which may be of the same type as integrators 79 and 80. The outputs of integrators 81 and 82 may be referred to respectively as $S_{1a}$ and $S_{2a}$ and the magnitude of these outputs is representative of the acoustic energy present in the passband of filters $F_1$ and $F_2$ at a time prior to $T_0$ which has been delayed by times $\tau_1$ and $\tau_2$, respectively.

Recalling that Equation (14) predicts that each mode of the system has a time dependence which contains a term of the form $$A_j e^{-\alpha_j t} e^{i\omega_j t}$$

we may write the ratio equality for two different times $T_0$ and $(T_0 + \tau_1)$ for the first mode as $$\frac{S_{1b}}{S_{1a}} = \frac{A_1 e^{-\alpha_1 T_0}}{A_1 e^{-\alpha_1(T_0 - \tau_1)}} = e^{-\alpha_1 \tau_1} \quad (18)$$

or solving Equation (18) for $\alpha_1$ (the attenuation constant at $F_1$, the frequency of the first mode)

$$\alpha_1 = (\ln S1b - \ln S1a)/\tau_1 \quad (19)$$

and similarly for the attenuation function $\alpha_2$ at $F_2$, the frequency of the second mode $$\alpha_2 = (\ln S2b - \ln S2a)/\tau_2 \quad (20)$$

With these relationships established, we may now turn to the further processing of signals $S_{1a}$, $S_{1b}$, $S_{2a}$ and $S_{2b}$.

It will be recalled that signals $S_{1a}$ and $S_{1b}$ are the integrated outputs of the bandpass filter $F_1$ at two distinct points in time separated by the time $\tau_1$. Thus, using these output signals in Equation (19) the attenuation constant at the frequency of the first mode ($\chi_1$) may be computed. The signals $S_{1a}$ and $S_{1b}$ are input to a special purpose analog computer 87 which performs this calculation. Computer 87 may be a suitable analog circuit as known in the art to perform the indicated computation and details of its circuitry need not be gone into. Similarly, signals $S_{2a}$ and $S_{2b}$ are the integrated outputs of the bandpass filter $F_2$ which are taken at two distinct points in time $\tau_2$ seconds apart ($\tau_2$ may be made equal to $\tau_1$ for convenience). The signals $S_{2a}$ and $S_{2b}$ are input to an analog computer 88 which performs the computation of $\alpha_2$ as indicated in Equation (20) simultaneously with the computation of $\alpha_1$ in computer 87. Thus, output signals representative of $\alpha_1$ and $\alpha_2$ are available at the outputs of the computers 87 and 88. These signals could be recorded as a function of borehole depth themselves or further signal processing using these attenuation constants may be performed to extract the cement thickness $t$ and micro-annulus width $\epsilon$.

If the attenuation functions $\alpha_1$ and $\alpha_2$ together with prior knowledge of the type of formations surrounding the well bore at the depth in question are known, say from acoustic travel time ($\Delta t$) logs taken prior to the casing of the borehole, then the appropriate set of Equations (15), (16) or (17) may be used to compute the values of $\epsilon$ (micro-annulus width) and $t$ (cement thickness).

In operation, the logging operator could, for example, by activating the selector switch 89, route the computed attenuation constants $\alpha_1$ and $\alpha_2$ to the appropriate special purpose analog computers 90, 91 and 92 for the type of formation being encountered so that the appropriate set of equations could be utilized to compute $\epsilon$ and $t$. Alternatively, selector switch 89 could be driven by a preselected punched paper tape or magnetic tape based on a prior derived sonic $\Delta t$ log to select the appropriate computer for $\epsilon$ and $t$ at the depth in question. In any event the $\alpha_1$ and $\alpha_2$ signals are utilized in the simultaneous equations involving $\epsilon$ and $t$ to compute these cement evaluation parameters. By solving the two simultaneous equations i.e., Equations (15), (16) or (17) as appropriate) in the two unknowns $\epsilon$ and $t$, the values of the annulus width and cement thickness may be derived.

It should be noted that the different sets of simultaneous Equations (15), (16) and (17) for the unknown values of $\epsilon$ and $t$ for different formation types are all of the form $$\alpha_1 = k_1\epsilon + K_2 t + K_3$$
$$\alpha_2 = K_4\epsilon + K_5 t + K_6$$

(21)

where the coefficients $K_1$ to $K_6$ are different for the different formation types. If $\alpha_1$ and $\alpha_2$ are known, as they are once the outputs of computers 87 and 88 are available, then $\epsilon$ and $t$ may be computed from Equation (21) by elimination of variables as $$\epsilon = K_5\alpha_1 - K_2\alpha_2 - K_5 K_3 + K_2 K_6)/(K_5 K_1 - K_2 K_4)$$

(22)

$$t = (K_4\alpha_1 - K_1\alpha_2 - K_4 K_3 + K_1 K_6)/(K_4 K_2 - K_5 K_1)$$

(23)

Computers 90, 91 and 92 are special purpose analog computers designed to perform the calculations indicated in Equations (22) and (23).

Figure 8:
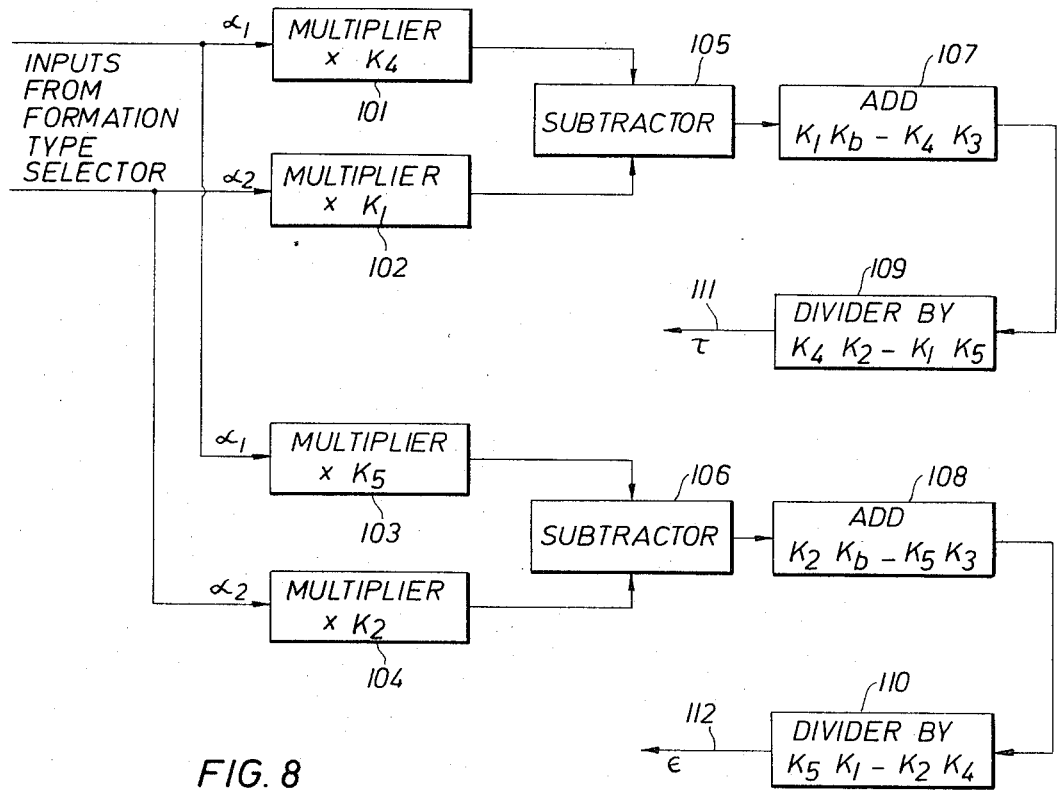
FIG. 8 is a block diagram of an analog computer used to compute the cement thickness and micro-annulus width.

Referring now to FIG. 8, a block diagram of a representative one of the special purpose analog computers 90, 91 or 92 is shown. The constants $K_1$, $K_2$, $K_3$, $K_4$, $K_5$ and $K_6$ are all known for each particular type of formation. These are represented in the computer of FIG. 8 by known voltage levels. The computed values of $\alpha_1$ and $\alpha_2$ are input to the special purpose computers 90, 91 and 92 as voltage levels on the input lines shown in FIG. 8.

To solve the simultaneous Equations (21) for the cement thickness $t$ the input signals $\alpha_1$ and $\alpha_2$ are multiplied by the constants $K_4$ and $K_1$ respectively in analog multipliers 101 and 102. The outputs of multipliers 101 and 102 are input to an analog subtractor 105 where a signal representative of the difference $K_4\,\alpha_1 - K_1\,\alpha_2 = \Delta$ is formed. This difference signal $\Delta$ then is input to an analog adder 107 which forms the sum $\Delta + K_1 K_6 - K_4 K_3$ which completes the computation of the numerator of the expression of Equation (23). The numerator is then divided by the known denominator $K_5\,K_1 - K_2\,K_4$ is analog divider 109 resulting in the output of an analog voltage on line 111 which is representative of $t$, the cement thickness.

Similarly, to solve for $\epsilon$, the micro-annulus thickness, the input voltages $\alpha_1$ and $\alpha_2$ are multiplied by constants $K_5$ and $K_2$ in analog multipliers 103 and 104 respectively. The products are then input to analog subtractor 106 where a signal representative of the difference $K_5\,\alpha_1 - K_2\,\alpha_2 = \Delta$ is formed. This difference signal $\Delta$ is then input to analog adder 108 where the numerator of the expression in Equation (22) is formed. The analog signal representative of the numerator of (22) is then input to an analog divider 110 which divides it by the known denominator $K_5\,K_1 - K_2\,K_4$ resulting in the output on line 112 of an analog voltage representative of the micro-annulus width $\alpha$.

The analog signals representative of $\epsilon$ and $t$ may then be input to a recorder such as the recorder 93 of FIG. 6 which also receives information on borehole depth from the mechanical winch arrangement. In this manner a cement evaluation log consisting of a plot of $\epsilon$ and $t$ as a function of depth may be recorded. The entire logging cycle just described may be repeated in a periodic manner many times per second as the logging tool is moved through the borehole thus providing a smooth and continuous appearing log of the quantities $\epsilon$ and $t$.

It will be appreciated by those skilled in the art that while the embodiment shown and described utilizes the attenuation constants of the characteristic frequencies, or modes, of the system to derive an accurate and reliable cement evaluation log that various other parameters associated with these modes or resonances may be used to indicate the quality of the cement job. For example, the previously discussed reflection coefficients of the system may be utilized as shown in a copending patent application entitled, "Cement Evaluation Logging By Use of Reflection Coefficients" by R. G. Beil, Ser. No. 840,355, filed July 9, 1969 now U.S. Pat. No. 3,638,840 which is assigned to the assignee of the present invention. Further, a direct log of the reflection coefficient spectrum of the system may be performed for this purpose as shown in another copending patent application entitled, "Acoustic Reflection Coefficient Logging" by John D. Ingram, Ser. No. 840,179 filed July 9, 1969. Moreover, it would be possible to discern valuable information on cement conditions by logging other parameters associated with the modes of the system such as their frequency widths, Q values, or exact maxima frequencies. All such variations of the basic principles of the preset invention are considered to be within the scope of the present invention which is the first such acoustic logging scheme based upon the examination of the radial transfer of acoustic energy from the borehole system into the formations in the frequency region of the radial modes or resonances of the system.

While a particular embodiment of the present invention has been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A method for determining cement effectiveness in a cased well borehole comprising the steps of:
    transmitting a component of acoustic energy radially outwardly from the well bore into the cement and surrounding formations;
    receiving a reflected portion of the transmitted acoustic energy and generating a signal representative thereof; and
    processing said representative signal by selecting given frequency components of said representative signal in at least one frequency band and computing from said selected frequency components a parameter associated with at least one of the radial frequency resonances of the borehole-casing-cement-formation system to evaluate the cement condition.

2. The method of claim 1 wherein the steps are performed repetitively while moving a well tool housing at least one acoustic transmitter and at least one acoustic receiver vertically through the well bore and recording said parameter as a function of depth.

3. A method for determining the effectiveness of cement disposed in the annulus between the casing and formation in a cased borehole comprising the steps of:
    transmitting a component of acoustic energy radially outwardly from the well bore into the cement and surrounding formations;
    receiving a reflected portion of the transmitted acoustic energy and generating a signal representative thereof;
    isolating plural frequency portions of said representative signal associated with the radial resonance frequencies of the borehole-casing-cement-formation system and respectively generating for each of said isolated portions, signals representative of the amplitude of said representative signal in said isolated portions; and
    processing said signals representative of the amplitude of said representative signal in said isolated frequency portions to generate signals representative of the attenuation constants of a plurality of the radial resonance frequencies of the borehole-casing-cement-formation system.

4. The method of claim 3 wherein the steps are performed periodically while moving a well tool having at least one acoustic transmitter and at least one acoustic receiver vertically through the well bore and recording said attenuation constant signals as a function of depth.

5. The method of claim 3 and further including the step of:
combining said plurality of signals representative of the attenuation constants to generate signals representative of the cement thickness and the width of the annulus between the casing and the cement.

6. A method for evaluating the effectiveness of cement disposed between the casing and formations in a cased borehole comprising the steps of:
transmitting a component of acoustic energy radially outwardly form the well bore into the cement and surrounding formations;
receiving a reflected portion of the transmitted acoustic energy and generating a signal representative thereof;
isolating plural frequency regions of said representative signal and generating first electrical signals representative of said isolated regions by passing said representative signal through a plurality of relatively narrow bandpass frequency filters, the frequency pass bands of said filters being chosen to coincide with the radial resonance frequencies of the borehole-casing-cement-formation system;
generating amplitude signals representative of the amplitudes of each of said first electrical signals at two distinct points in time; and
generating attenuation constant signals, responsive to said amplitude signals, representative of the attenuation constants of a plurality of the radial resonances of the borehole-casing-cement-formation system.

7. The method of claim 6 and further including the step of:
generating second and third electrical signals in response to said attenuation constant signals of at least two of the radial resonances of the system, said second and third signals being representative of the cement thickness and width of the annulus between the cement and the casing.

8. The method of claim 7 wherein the steps are performed periodically while moving a well tool having at least one acoustic transmitter and at least one acoustic receiver vertically through the well bore.

9. The method of claim 8 and further including the steps of recording said attenuation constant signals, and said signals representative of the cement thickness and the annulus width.

10. A method for logging a cased well borehole to determine the effectiveness of cement disposed in the annulus between the casing and the formations comprising the steps of:
moving a logging tool having at least one acoustic transmitter and at least one acoustic receiver vertically through the well bore;
repetitively firing said acoustic transmitter to emit a component of acoustic energy radially outwardly from the well bore into the cement and surrounding formations;
repetitively activating said acoustic receiver in response to said transmitter firing to receive a reflected portion of the transmitted acoustic energy and to generate electrical signals representative thereof;
isolating plural frequency regions of said representative signal and generating signals representative of said representative signal in the isolated frequency regions by passing said representative signal through a plurality of bandpass frequency filters;
generating amplitude signals representative of the amplitudes of each of the plurality of isolated frequency region signals at two distinct points in time;
generating attenuation constant signals, responsive to said amplitude signals at two distinct points in time, said signals being representative of the attenuation constants associated with the radial resonances of the borehole-casing-cement-formation system;
generating first signals functionally related to said attenuation constant signals which are representative of the thickness of the cement disposed in the annulus between the casing and the formation; and
generating second signals functionally related to said attenuation constant signals which are representative of the width of the annulus between the cement and the casing.

11. The method of claim 10 and further including the step of recording said first and second signals functionally related to said attenuation constant signals as a function of borehole depth.

12. The method of claim 11 and further including the step of recording said attenuation constant signals as a function of borehole depth.

13. The method of claim 10 wherein the step of isolating plural frequency regions of said representative signal is performed by isolating relatively narrow frequency regions in the frequency range of the radial modes of the well-bore-casing-cement-formation system by passing said representative signal through at least two relatively narrow bandpass filters whose center frequencies are chosen to coincide with a plurality of predetermined radial resonance frequencies of the borehole-casing-cement-formation system.

14. A method for logging a cased well borehole to determine the effectiveness of cement disposed in the annulus between the casing and the formations comprising the steps of:
moving a logging tool having at least one acoustic transmitter and at least one acoustic receiver vertically through the well bore;
periodically firing said acoustic transmitter to emit a component of acoustic energy radially outwardly from the well bore into the cement and surrounding formations;
periodically activating said acoustic receiver in response to said transmitter firing to receive a reflected portion of the transmitted acoustic energy and to generate electrical signals representative thereof;
passing said representative signal through at least two relatively narrow bandpass frequency filters whose center frequencies are chosen to coincide with at least two predetermined radial modes of the borehole-casing-cement-formation system, to generate plural first mode signals representative of the portion of said received signal in the immediate frequency region of a plurality of the radial modes of the system;
storing said first mode signals for a predetermined length of time while continuing to execute the step of passing said representative signal through said bandpass filters to generate a plurality of second mode signals for each of said plurality of radial modes separated in time by a predetermined amount from said first mode signals; and computing in response to said first and second mode signals, the attenuation constants associated with the plurality of radial modes and generating plural signals representative of said attenuation constants.

15. The method of claim 14 and further including the steps of:

computing in response to a predetermined relation of said plural attenuation constant signals, the thickness of cement disposed in the annulus between the casing and formations and the width of the annulus between the casing and cement and generating signals representative of said cement thickness and annulus width; and recording as a function of borehole depth said attenuation constant signals, said cement thickness signal and said annulus width signal.

16. Apparatus for logging a cased well borehole to determine the effectiveness of cement disposed in the annulus between the casing and the formations comprising:

transducer means for transmitting a component of acoustic energy radially outwardly from the well bore into the cement and surrounding formations and for receiving a reflected portion of the transmitted acoustic energy and generating an electrical signal representative thereof;

means for isolating plural frequency regions of said representative signal and generating signals representative of the portion of said signal in the isolated frequency regions; and means for generating signals representative of the amplitudes of each of said plurality of isolated frequency region signals at two distinct points in time and for generating attenuation constant signals, responsive to said signals representative of amplitudes, said attenuation constant signals being representative of the attenuation constants of a plurality of the radial resonances of the borehole-casing-cement-formation system.

17. The apparatus of claim 16 and further including means for generating a signal in response to said attenuation constant signals which is representative of the thickness of cement disposed between the casing and the formation.

18. The apparatus of claim 16 and further including means for generating a signal in response to said attenuation constant signals which is representative of the width of the annulus between the casing and the cement.

19. The apparatus of claim 16 and further including means for recording said attenuation constant signals.

20. The apparatus of claim 16 wherein said means for isolating plural frequency regions of said representative signals includes plural relatively narrow bandpass frequency filters whose center frequencies are chosen to coincide with a predetermined plurality of radially resonant mode frequencies of the well-bore-casing-cement-formation system.

21. Apparatus for processing electrical signals representative of a reflected portion of a component of acoustic energy transmitted radially outwardly from a cased well borehole into the cement and surrounding formations comprising:

means for isolating plural frequency regions of the representative signal and for generating signals representative of the portion of said signal in the isolated frequency regions; and means for generating signals representative of the amplitudes of each of said plurality of isolated frequency region signals at two distinct points in time and for generating attenuation constant signals, responsive to said signals representative of amplitudes, said attenuation constant signals being representative of the attenuation constants of a plurality of the radial resonances of the borehole-casing-cement-formation system.

22. The apparatus of claim 21 and further including means for generating a signal in response to said attenuation constant signals which is representative of the thickness of cement disposed between the casing and the formation.

23. The apparatus of claim 21 and further including means for generating a signal in response to said attenuation constant signals which is representative of the width of the annulus between the casing and the cement.

24. Apparatus for logging a cased well borehole to determine the effectiveness of cement disposed in the annulus between the casing and the formations comprising:

acoustic energy transmitting means capable of transmitting a component of acoustic energy radially outwardly form the well bore into the cement and surrounding formations;

means for receiving a reflected portion of the transmitted acoustic energy and generating an electrical signal representative thereof;

means for moving said transmitting means and said receiving means vertically through the well bore;

means for periodically activating said transmitting means and said receiving means in response to the firing of said transmitting means as the transmitting and receiving means are moved through the well bore;

means for isolating plural frequency regions of the received acoustic signal associated with a plurality of radial resonances of the well-bore-casing-cement-formation system, and generating plural signals representative of the portion of said received signal in said isolated regions;

means for generating signals representative of the amplitudes of each of said plurality of isolated frequency region signals at two distinct points in time;

means for generating attenuation constant signals functionally related to said signals representative of the amplitudes of said plurality of isolated frequency region signals, said attenuation constant signals being representative of the attenuation constants of the radial resonances of the well-bore-casing-cement-formation system; and recorder means coupled to said means for moving said transmitter and receiving means through the well bore for recording said attenuation constant signals as a function of borehole depth.

25. The apparatus of claim 24 and further including means responsive to said attenuation constant signals for generating signals representative of the thickness of cement disposed in the annulus between the casing and the formation.

26. The apparatus of claim 25 and further including means for generating signals representative of the width of the annulus between the casing and the cement.

27. The apparatus of claim 26 and further including recorder means coupled to said means for moving said transmitting and receiving means through the well bore for recording said cement thickness signals and said annulus width signals as a function of borehole depth.

28. The apparatus of claim 24 wherein said means for isolating plural frequency regions of the received acoustic signal comprises plural relatively narrow bandpass frequency filters having their center frequencies chosen to coincide with the predetermined radially resonant frequencies of the well-bore-casing-cement-formation system.

* * * * *